United States Patent
Okada

(10) Patent No.: US 6,518,741 B1
(45) Date of Patent: Feb. 11, 2003

(54) MODULATION ANALYZING APPARATUS WITH BALANCE/IMBALANCE CONVERTER

(75) Inventor: Tomohisa Okada, Isehara (JP)

(73) Assignee: Anritsu Corporation, Tokyo (JP)

( * ) Notice: Subject to any disclaimer, the term of this patent is extended or adjusted under 35 U.S.C. 154(b) by 0 days.

(21) Appl. No.: 09/868,784

(22) PCT Filed: Nov. 13, 2000

(86) PCT No.: PCT/JP00/07997

§ 371 (c)(1),
(2), (4) Date: Jun. 21, 2001

(87) PCT Pub. No.: WO01/37464

PCT Pub. Date: May 25, 2001

(30) Foreign Application Priority Data

Nov. 16, 1999 (JP) .............................. 11-325847

(51) Int. Cl.⁷ .................. G01R 23/00; G01R 23/14; G01R 23/20; G01D 1/14
(52) U.S. Cl. ................ 324/76.19; 324/76.25; 324/76.23; 324/615; 324/620
(58) Field of Search ............ 324/76.25, 615, 324/620, 76.19, 76.23, 76.21, 76.12; 375/346, 347, 344

(56) References Cited

U.S. PATENT DOCUMENTS 6,140,822 A * 10/2000 Williams .................... 324/620
6,198,783 B1 * 3/2001 Campana, Jr. .............. 375/346
6,211,663 B1 * 4/2001 Mouthrop et al. ....... 324/76.23
6,392,398 B1 * 5/2002 Toraichi et al. .......... 324/76.21

FOREIGN PATENT DOCUMENTS

| JP | 1-168877 | 11/1989 |
| JP | 9-321717 | 12/1997 |
| JP | 11-308152 | 11/1999 |

* cited by examiner

Primary Examiner—Christine Oda
Assistant Examiner—Wasseem Hamdan
(74) Attorney, Agent, or Firm—Frishauf, Holtz, Goodman & Chick, P.C.

(57) ABSTRACT

An inversion in-phase component and a non-inversion in-phase component of a modulation signal inputted from a quadrature modulation section of a sample machine captured in a pair of signal lines, and an inversion quadrature component and a non-inversion quadrature component of the modulation signal, are computed by a pair of computers, respectively. In addition, these components are analog/digital converted at a pair of analog/digital converting sections, and then, are stored in a waveform storage memory. A modulation characteristics analyzing section performs predetermined computation processing of the storage data, thereby analyzing modulation characteristics of the modulation signal. A balance/imbalance switching section is provided at each one of the pair of signal lines, and the signal lines are grounded, whereby a state for transmitting a modulation signal of a balance transmission format is switched to a state for transmitting a modulation signal of an imbalance transmission format.

15 Claims, 5 Drawing Sheets

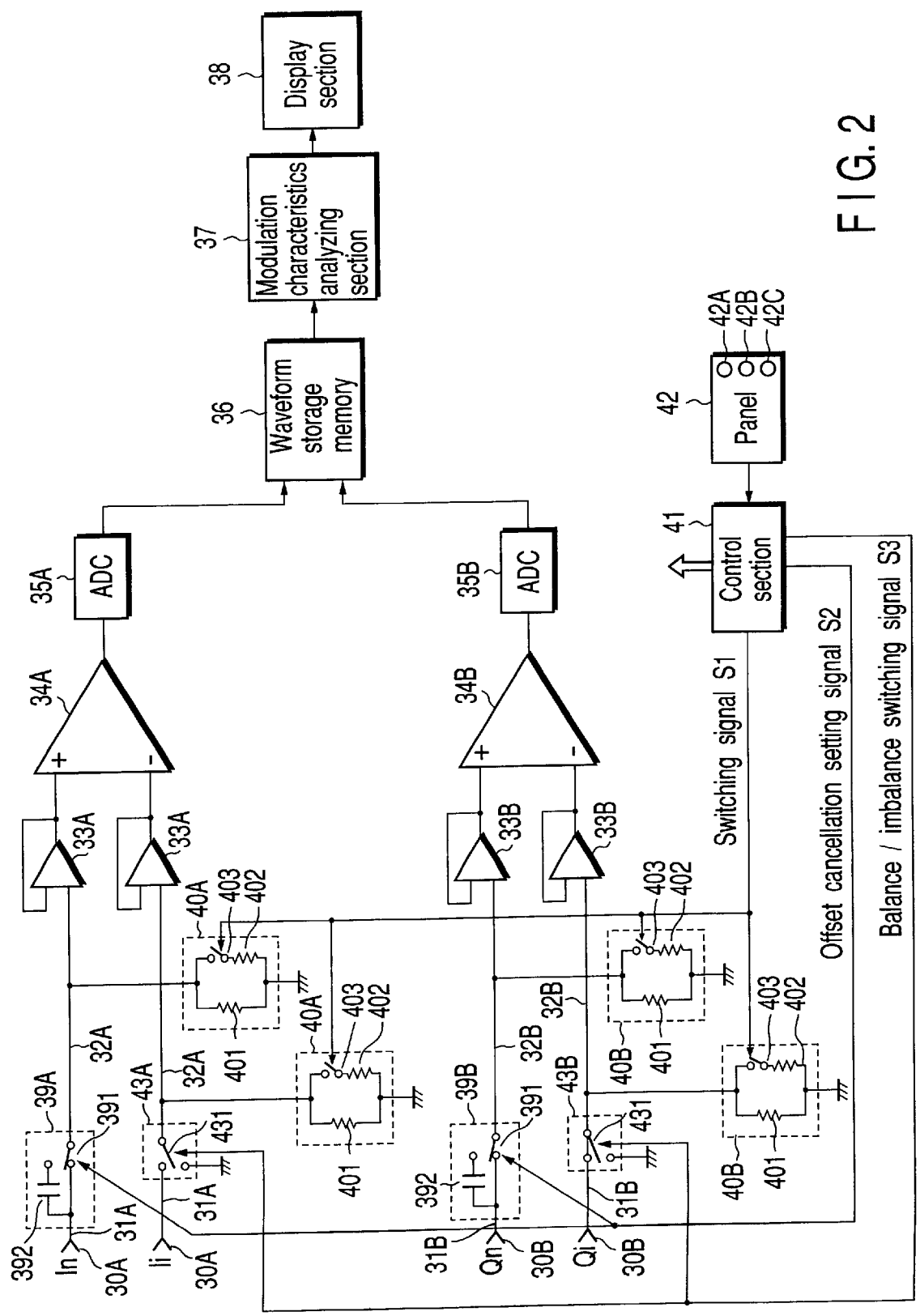
F I G. 2

MODULATION ANALYZING APPARATUS WITH BALANCE/IMBALANCE CONVERTER

TECHNICAL FIELD

The present invention relates to a modulation analyzing apparatus. In particular, the present invention relates to a modulation analyzing apparatus for performing modulation analysis at terminals of a variety of communication systems in which a mobile communication system is employed as a typical example.

BACKGROUND ART

One method of evaluating characteristics of terminals in a mobile communication system includes modulation analysis caused by IQ input.

This analysis is associated with device evaluation of a modulation/demodulation IC incorporated in a hand-held telephone, for example. The analysis is important in the manufacture and inspection of equipment and device that configure a communication system as well as a terminal.

A conventional example of such a modulation analyzing apparatus will be described with reference to FIG. 3 and FIG. 4.

In FIG. 3, reference numeral 10 denotes a radio (hand-held telephone) of a mobile communication system, for example, employed as a sample machine.

This radio (hand-held telephone) 10 comprises a base band section 10A, a quadrature modulating section 10B, a frequency converting section 10C and the like.

Some functions of these sections are achieved by a modulation/demodulation IC (not shown).

From a modulation analyzing apparatus main body 20, there is derived a measurement cable 20 having at its end a probe 20B for receiving an in-phase component I and a quadrature component Q of a base band (modulation) signal from the base band section 10A of the radio (hand-held telephone) 10.

A display section 20C and an operating section 20D or the like are provided at this modulation analyzing apparatus main body 20.

As shown in FIG. 4, the in-phase component I and quadrature component Q of a modulation signal for the quadrature modulating section 10B of the radio (hand-held telephone) 10 are subject to analysis processing through an amplifier 22 and an analog/digital converter (ADC) 23 provided in the modulation analyzing apparatus main body 20.

A modulation signal of a radio that is the sample machine is generally in accordance with an imbalance transmission format.

However, recently, as an IC of the low operation voltage type is fabricated, there is introduced a radio handling a modulation signal of balance transmission format.

In the case where modulation analysis of a radio for a modulation signal of balance transmission format is performed by a modulation analyzing apparatus described above, it is necessary to install a balance/imbalance converter at an input stage of the modulation analyzing apparatus.

Thus, in the conventional modulation analyzing apparatus described above, it is required to mount or remove a balance/imbalance converter according to whether the sample machine is of a balance transmission format or an imbalance transmission format. Because of this, there has been a problem that a communication system including the sample machine cannot be evaluated smoothly.

DISCLOSURE OF INVENTION

It is an object of the present invention to provide a modulation analyzing apparatus capable of performing modulation analysis simply irrespective of whether a modulation signal handled by the sample machine is of a balance transmission format or an imbalance transmission format.

According to one aspect of the present invention, there is provided a modulation analyzing apparatus comprising:

a pair of signal lines (32A and 32B) for capturing an inversion in-phase component and a non-inversion in-phase component of a modulation signal inputted to a quadrature modulating section of a sample machine and an inversion quadrature component and a non-inversion quadrature component of the modulation signal;

computers, including adders (34A and 34B), for computing each of the inversion in-phase component and non-inversion in-phase component of the modulation signal and each of the inversion quadrature component and non-inversion quadrature component of the modulation signal, from the pair of signal lines;

analog/digital converting sections (35A and 35B) for analog/digital converting outputs of the computer, respectively;

a waveform storage memory (36) for storing outputs of the analog/digital converting sections, respectively;

a modulation characteristics analyzing section (37) for reading out storage data from the waveform storage memory, and performing predetermined computation processing, thereby analyzing modulation characteristics of a modulation signal inputted to a quadrature modulating section of the sample machine;

a display section (38) for displaying the analysis result caused by the modulation characteristic analyzing section;

balance/imbalance switching sections (43A and 43B) provided at one of the pair of signal lines, the balance/imbalance switching sections grounding the signal lines, thereby switching a state for transmitting a modulation signal of balance transmission format into a state for transmitting a modulation signal of imbalance transmission format.

According to a modulation analyzing apparatus of the present invention, irrespective of whether an IQ input sample machine is of a balance transmission format or an imbalance transmission format, a measurer makes switching operation of a balance/imbalance switching sections (43A and 43B), whereby a signal line for capturing an in-phase component and a quadrature component of a modulation signal can be of balance or imbalance transmission format. Thus, the in-phase component and quadrature component of a modulation signal is directly captured to enable modulation analysis without mounting and removing the balance/imbalance converter. Hence, a communication system can be evaluated smoothly.

BRIEF DESCRIPTION OF DRAWINGS

FIG. 2 is a block diagram depicting a detailed configuration in the modulation analyzing apparatus according to the present invention shown in FIG. 1.

BEST MODE FOR CARRYING OUT OF THE INVENTION

Hereinafter, one embodiment of the present invention will be described with reference to FIG. 1, FIG. 2, FIG. 5, and FIG. 6.

Figure 1:
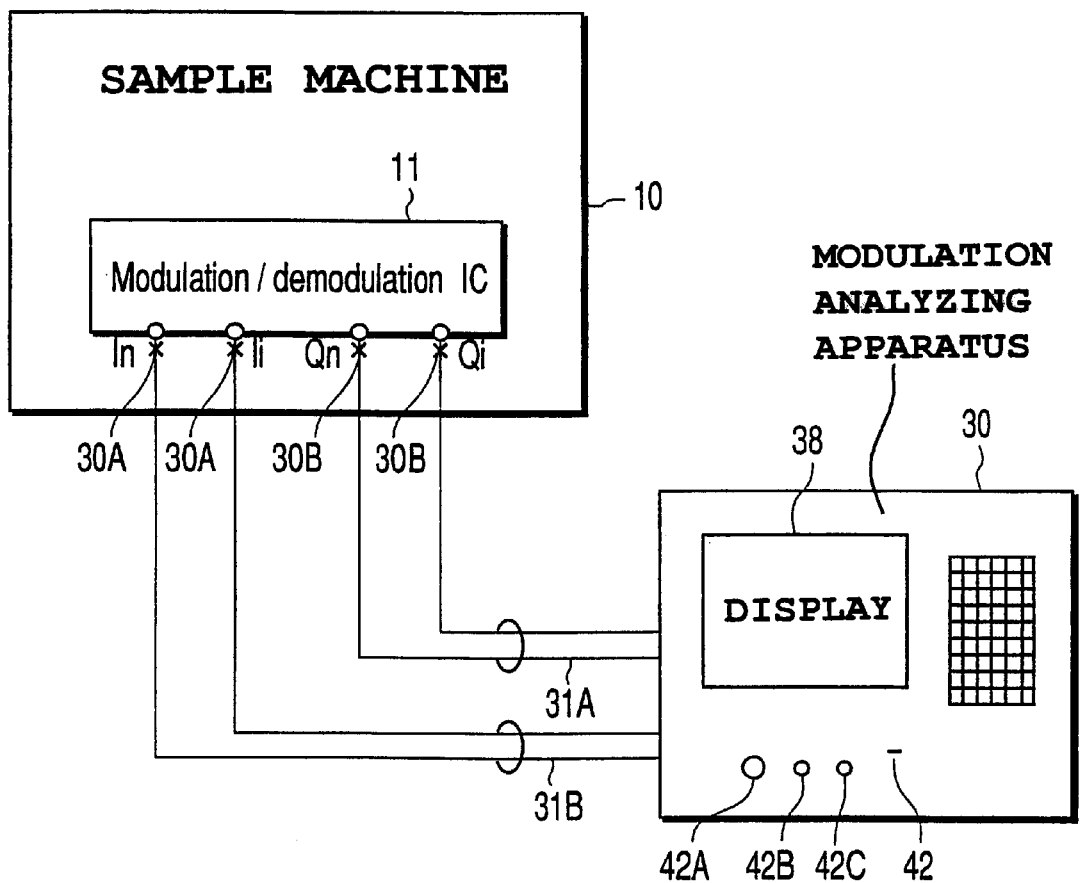
FIG. 1 is a view illustrating a schematic configuration of a modulation analyzing apparatus according to one embodiment of the present invention.
Figure 3:
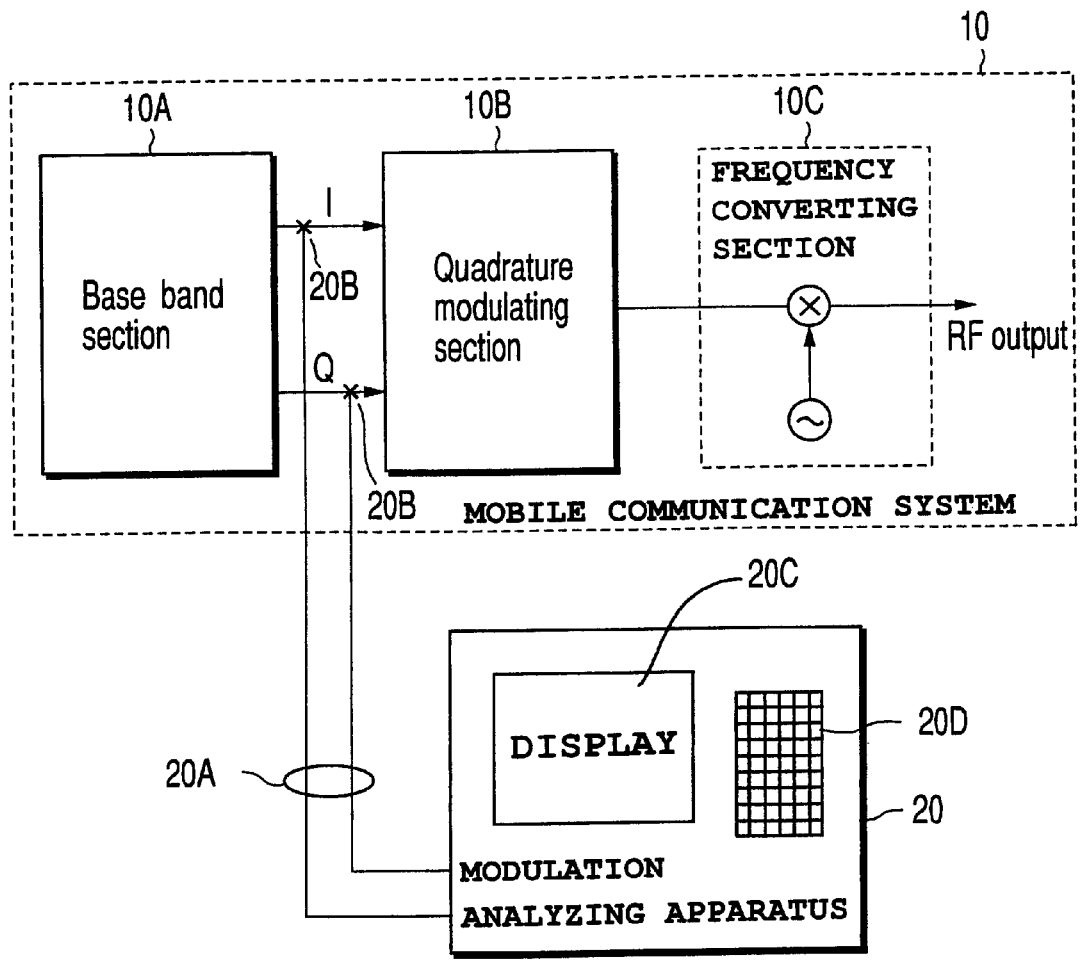
FIG. 3 is a view illustrating a schematic configuration of a conventional modulation analyzing apparatus.
Figure 4:
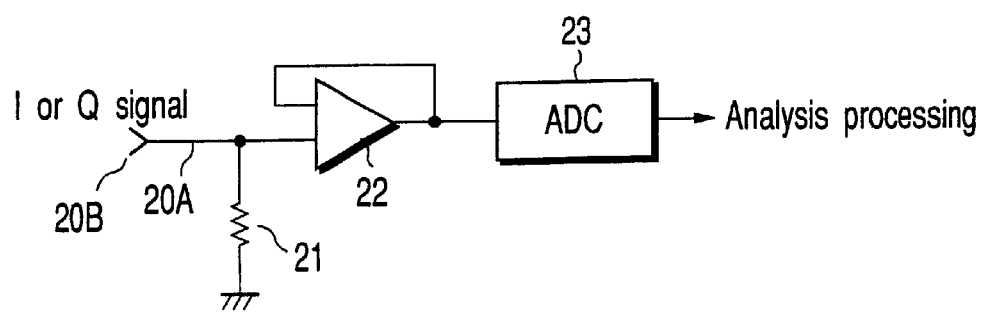
FIG. 4 is a block diagram depicting a detailed configuration of a part of the conventional modulation analyzing apparatus shown in FIG. 3.

In FIG. 1, a sample machine 10 such as a hand held telephone incorporates a modulation/demodulation IC 11 commercially available for use as GSM 3V IF Subsystem AD6432 available from ANALOG DEVICE CO., LTD, for example.

From this modulation/demodulation IC 11, there are derived a non-inversion in-phase component In and an inversion in-phase component Ii of a base band signal; and a non-inversion quadrature component Qn and an inversion quadrature component Qi of a base band signal.

On the other hand, a pair of measurement cables 31A and 31B is derived from a modulation analyzing apparatus main body 30 via a connector or the like (not shown).

At the tip ends of a pair of these measurement cables 31A and 31B, a pair of probes 30A and 30B is provided.

In addition, in the modulation analyzing apparatus main body 30, a balance/imbalance changeover switch 42A and an offset cancellation switch 42B are provided at a panel 42 having a display section 38.

As shown in FIG. 2, at the inside of the modulation analyzing apparatus main body 30, there are provided a pair of signal lines 32A and 32B that capture non-inversion and inversion in-phase components In and Ii and non-inversion and inversion quadrature components Qn and Qi via a pair of measurement cables 31A and 31B.

In addition, a pair of amplifiers 33A and 33B for amplifying a signal to be transmitted to a pair of signal lines 32A and 32B is provided at the modulation analyzing apparatus main body 30.

Outputs from a pair of amplifiers 33A and 33B are each added by means of a pair of adders 34A and 34B after divided into the in-phase component I and quadrature component Q.

Each of the added outputs from a pair of adders 34A and 34B is converted into a digital value by means of a pair of analog/digital converters (ADC) 35A and 35B, and then, is inputted to and stored in a waveform storage memory 35A.

Storage data from this waveform storage memory 36 is read out at a modulation characteristics analyzing section 37, and predetermined computation processing is performed.

That is, the modulation characteristics analyzing section 37 for analyzing modulation characteristics of a modulation signal inputted to the quadrature characteristics analyzing section of the sample machine, comprises a microprocessor, a digital signal processor and the like, for example. The added outputs from the pair of adders 34A and 34B temporarily stored in the waveform storage memory 36 are read out, and computation of the degree of modulation or modulation precision and the like is performed.

The analysis result caused by this modulation characteristics analyzing section 37 is displayed at the display section 38.

In addition, the modulation analyzing apparatus main body 30 according to the present embodiment comprises a pair of offset cancellation circuits 39A and 39B.

A pair of these offset cancellation circuits 39A and 39B is provided at the non-inversion side of the pair of signal lines 32A and 32B. Then, an offset component of a signal transmitted to a pair of signal lines 32A and 32B is cancelled in response to an offset cancellation signal S2 from a control section 41.

That is, each of the pair of the offset cancellation circuits 39A and 39B comprises a pair of switches 391 and a pair of capacitors 392, respectively. When an offset cancellation signal S2 is supplied from the control section 41, the pair of switches 391 is closed at a pair of capacitors 392 side, whereby the offset components on the pair of signal lines 32A and 32B are cancelled by means of a pair of capacitors 392.

A pair of the balance/imbalance switching sections 43A and 43B is provided at the modulation analysis apparatus main body 30 according to the present embodiment.

A pair of these balance/imbalance switching sections 43A and 43B is provided at the inversion input side of the pair of signal lines 32A and 32B, and balance/imbalance transmission of the pair of signal lines 32A and 32B is switched in response to a balance/imbalance switching signal S3 from the control section 41.

That is, the pair of balance/imbalance switching sections 43A and 43B comprises a switch 431. During imbalance input, a pair of switches 431 is closed to the ground side, thereby grounding an input of the pair of amplifiers 33A and 33B.

In addition, during balance input, a pair of switches 431 is closed to the side of the probes 30A and 30B (Ii, Qi), thereby switching to a state in which the inversion in-phase signal Ii and inversion quadrature signal Qi are inputted to the pair of amplifiers 33A and 33B.

Further, the modulation analyzing apparatus main body 30 according to the present embodiment comprises a pair of impedance switching sections 40A and 4B.

The pair of these impedance switching sections 40A and 40B is provided at the pair of signal lines 32A and 32B, and balance/imbalance switching of a signal transmitted to the pair of signal lines 32A and 32B is performed in response to a switching signal Si from the control section 41.

That is, a pair of these impedance switching sections 40A and 40B is such that a resistor 401 having a high resistance value Ru (for example, 1 MΩ), a resistor 402 having a low resistance value Rb (for example, 50 Ω), and a serial circuit of a switch 403 are connected to each other in parallel.

One end of a pair of these impedance switching sections 40A and 40B is connected to a pair of these signal lines 32A and 32B, respectively, and the other end of the pair of impedance switching sections 40A and 40B are grounded.

The control section 41 in the present embodiment generates signals S3, S2, and Si by a measurer operating a balance/imbalance changeover switch 42A, an offset cancellation switch 42B, and an impedance changeover switch 42C.

In addition, this control section 41 governs control of each section in the apparatus according to the present embodiment.

Now, an advantageous effect of a modulation analyzing apparatus according to the present invention configured as described above, will be described here.

First, a measurer connects probes 30A and 30B of measurement cables 31A and 31B derived from the modulation analyzing apparatus main body 30 to a modulation/demodulation IC 11 of a sample machine 10 such as a hand-held telephone, and inputs the modulation signals In, Ii, Qn, and Qi from a modulation/demodulation IC 11 into the modulation analysis apparatus main body 30.

In the case where a modulation/demodulation IC 11 is of a balance type, the measurer operates the balance/imbalance changeover switch 42A.

Thus, the control section 41 supplies a balance/imbalance switching signal S3 to each of the balance/imbalance switching sections 43A and 43B.

A pair of balance/imbalance switching sections 43A and 43B to which this balance/imbalance switching section S3 is supplied is closed to the ground side of the switch 431, respectively.

In the case where a modulation/demodulation IC 11 is of an imbalance type, the measurer does not operate the balance/imbalance changeover switch 42A.

In this case, the control section 41 does not supply a balance/imbalance switching signal S3 to each of the balance/imbalance switching sections 43A and 43B.

Further, when the measurer operates an impedance changeover switch 42C, the control section 41 supplies a switching signal S1 to a pair of impedance switching sections 40A and 40B.

A pair of impedance switching sections 40A and 40B to which a switching signal Si is supplied close a switch 403, respectively.

In this manner, the resistance value of the pair of impedance switching section 40A and 40B is defined as Ru·Rb/(Ru+Rb).

In addition, when the measurer does not operate an impedance changeover switch 42C, the control section 41 does not supply the switching signal Si to each of the impedance switching sections 40A and 40B, and the resistance value of the impedance switching sections 40A and 40B is set to Ru.

As one example, Ru is 1 MΩ and Rb is 50Ω. In this case, when the switching signal Si is supplied by operating the impedance changeover switch 42C, the resistance value of the pair of impedance switching sections 40A and 40B is approximately 50 ohms. If the impedance changeover switch 42C is not operated, the resistance value of the impedance switching sections 40A and 40B is obtained as Ru=1 MΩ.

In this way, by the measurer's operation, an IQ signal can be supplied to each of subsequent sections of the pair of amplifiers 33A and 33B in response to any of an imbalance input and a balance input and in response to the switching of an input impedance, making it possible to perform modulation analysis.

Such switching of an imbalance input and a balance input and, switching of whether or not an offset coming from the pair of signal lines is cancelled, and switch setting of an input impedance can be performed on a screen of the display section 38 under the control of the control section 41.

Figure 5:
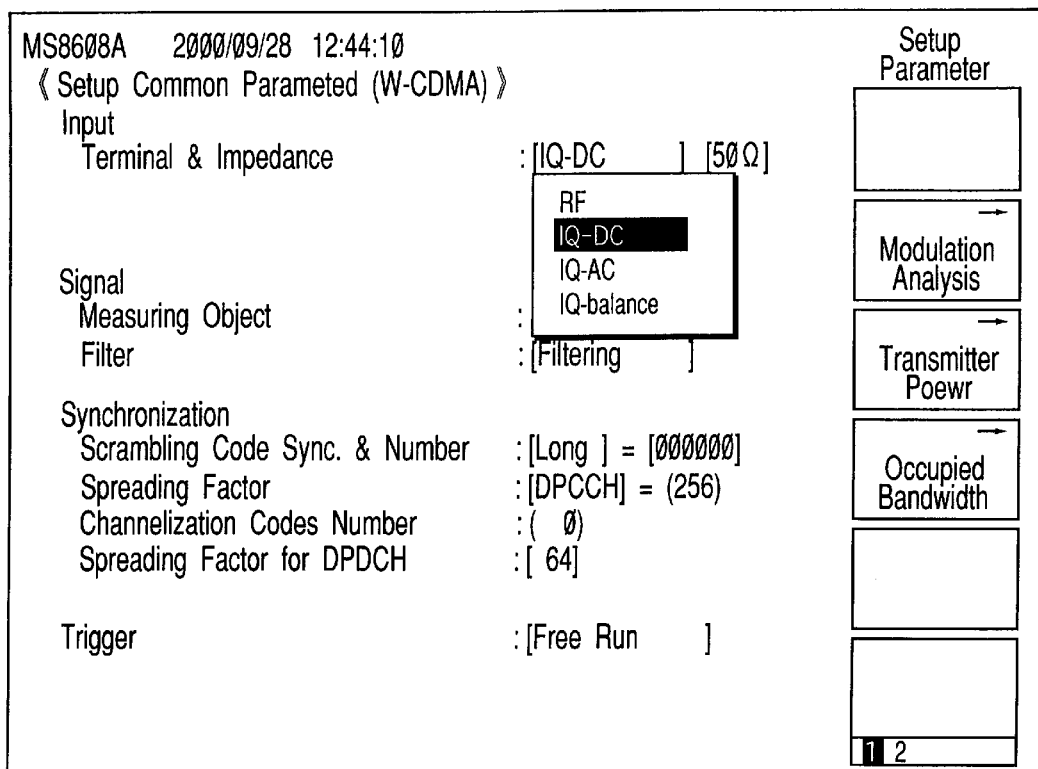
FIG. 5 is a view exemplifying a setting screen caused by the modulation analyzing apparatus according to the present invention shown in FIG. 2.
Figure 6:
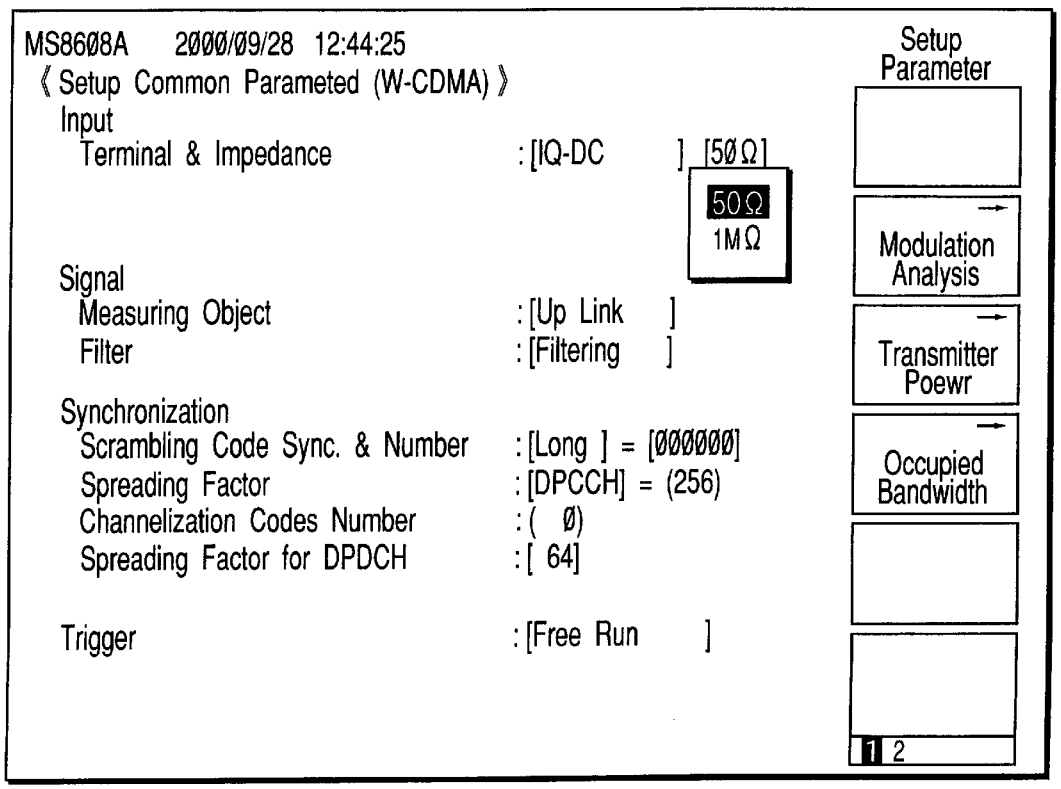
FIG. 6 is a view exemplifying a setting screen caused by the modulation analyzing apparatus according to the present invention shown in FIG. 2.

FIG. 5 and FIG. 6 show an example of a setting screen performed on the screen of such display section 38.

This indicates that, on the setting screen of FIG. 5, an imbalance input IQ-IC caused by inversion display is selected from input mode RF, balance input IQ-balance, and imbalance inputs IQ-DC and IQ-AC.

In addition, the setting screen of FIG. 6 indicates that 50 Ω caused by inversion display is selected from an input impedance 50 Ω and an input impedance 1 MΩ.

Figure 7:
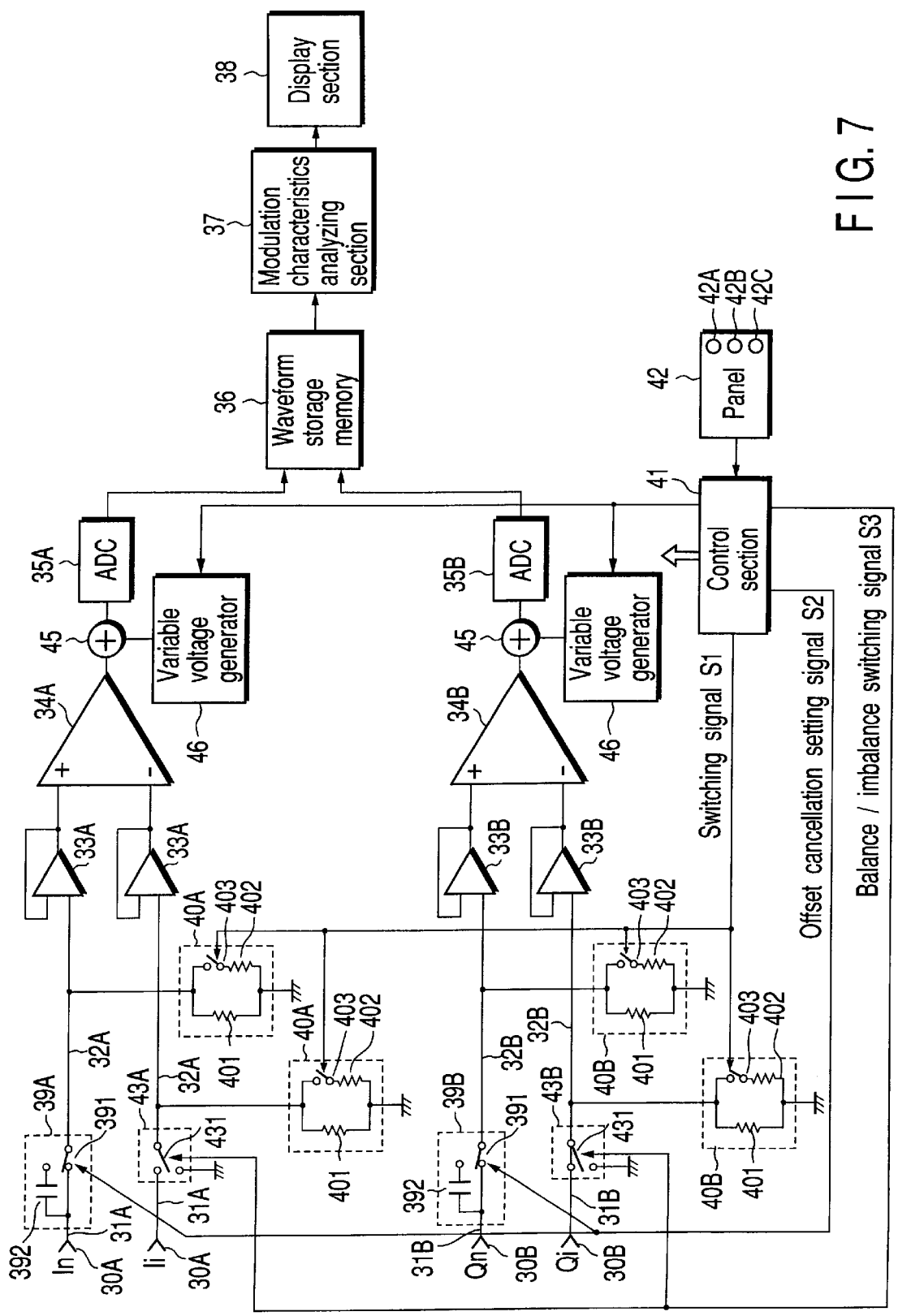
FIG. 7 is a block diagram depicting a modified example when a configuration of compensating for an offset caused by a bias current Ib of a pair of amplifiers 33A and 33B shown in FIG. 2 is employed.

FIG. 7 shows a part of a modified example of the above described embodiment when there is employed a configuration for canceling an offset voltage caused by an input bias current Ib of the pair of amplifiers 33A and 33B.

That is, in this modified example, a pair of adders 45 is connected between a pair of amplifiers 34A and 34B for adding outputs of a pair of amplifiers 33A and 33B each and a pair of ADC 35A and ADC 35B, and a pair of variable voltage generators 46 is connected to the other end of inputs of a pair of adders 45.

In this case, under the control of the control section 41, an offset compensation voltage is applied to the other end of each of the inputs of a pair of adders 45 from a pair of variable voltage generators 46 such that offset voltages Ib×25 Ω, Ib×50 Ω, 1b×1 Ω, 1b×1 MΩ caused by a bias current Ib of a pair of amplifiers 33A and 33B are offset according to input impedance 2 5Ω, 50 Ω, 1 Ω, or 1 MΩ taken by the pair of signal lines 32A and 32B.

As described above, according to the present embodiment, unlike the conventional example, modulation analysis can be performed without mounting and removing a balance/imbalance converter, and a communication system can be evaluated smoothly.

As has been described above, according to the present invention, there can be provided a modulation analyzing apparatus for capturing an in-phase component and a quadrature component of a modulation signal in a communication system that includes a quadrature modulating section, and analyzing at least the modulation characteristics of the quadrature modulating section based on the signal, wherein a balance/imbalance switching section and an impedance switching section for selectively setting an impedance of a transmission path are provided at a signal line for capturing an in-phase component and a quadrature component of the modulation signal, whereby a measurer operates a balance/imbalance switching section and an impedance switching section, whereby a signal line for capturing an in-phase component and a quadrature component of a modulation signal can be defined as a balance or imbalance transmission format at a desired impedance, and thus, mounting and removing of the balance/imbalance converter is eliminated, the in-phase component and quadrature component of a modulation signal are directly captured, and modulation analysis can be performed, thereby making it possible to smoothly evaluate a communication system.

What is claimed is:

1. A modulation analyzing apparatus comprising:
   a pair of signal lines for capturing an inversion in-phase component and a non-inversion in-phase component of a modulation signal inputted to a quadrature modulating section of a sample machine and an inversion quadrature component and a non-inversion quadrature component of the modulation signal;
   computers for computing each of the inversion in-phase component and the non-inversion in-phase component of the modulation signal and each of the inversion quadrature component and the non-inversion quadrature component of the modulation signal, from the pair of signal lines;

analog/digital converting sections for analog digital converting outputs of the computer, respectively;

a waveform storage memory for storing outputs of the analog/digital converting section, respectively;

a modulation characteristics analyzing section for reading out storage data from the waveform. storage memory, and performing predetermined computation processing, thereby analyzing modulation characteristics of the modulation signal inputted to the quadrature modulating section of the sample machine;

a display section for displaying the analysis result caused by the modulation characteristic analyzing section;

balance/imbalance switching sections provided at each of the pair of signal lines, the balance/imbalance switching sections grounding the signal line, thereby switching a state for transmitting a modulation signal of a balance transmission format into a state for transmitting a modulation signal of an imbalance transmission format.

2. The modulation analyzing apparatus according to claim 1, wherein the inversion in-phase component and the non-inversion in-phase component of the modulation signal inputted to the quadrature modulating section of the sample machine and the inversion quadrature component and the non-inversion quadrature component of the modulation signal, are derived from a dedicated modulation/demodulation IC as a non-inversion in-phase component In and an inversion in-phase component Ii of a base band signal and a non-inversion quadrature component Qn and an inversion quadrature component Qi of the base band signal.

3. The modulation analyzing apparatus according to claim 1, wherein the balance/imbalance switching section includes a balance/imbalance changeover switch provided at a panel in the modulation analyzing apparatus main body.

4. The modulation analyzing apparatus according to claim 3, wherein the balance/imbalance switching section comprises the pair of balance/imbalance switching sections provided at the inversion input side of the pair of signal lines, the pair of the balance imbalance switching sections switching balance/imbalance transmission of the pair of signal lines in response to the balance/imbalance switching signal based on an operation of the balance/imbalance changeover switch.

5. The modulation analyzing apparatus according to claim 4, wherein the pair of balance/imbalance switching sections comprises a pair of switches, and the pair of switches is closed to a ground side during imbalance input based on the operation of the balance imbalance changeover switch.

6. The modulation analyzing apparatus according to claim 4, wherein the pair of switches is closed to the quadrature modulation section side of the sample machine during balance input based on non-operation of the balance/imbalance changeover switch, thereby switching to a state in which the inversion in-phase signal and the inversion quadrature signal are inputted.

7. The modulation analyzing apparatus according to claim 1, further comprising:

an offset cancellation switch provided at the panel of a modulation analyzing apparatus main body; and offset cancellation means for canceling an offset coming from the pair of signal lines based on the operation of the offset cancellation switch.

8. The modulation analyzing apparatus according to claim 7, wherein the offset cancellation means includes a pair of offset cancellation circuits provided at a non-inversion side of the pair of signal lines, the pair of offset cancellation circuits canceling an offset component of a signal transmitted to a pair of signal lines in response to the offset cancellation signal based on the operation of the offset cancellation switch.

9. The modulation analyzing apparatus according to claim 8, wherein the pair of the offset cancellation circuits comprises a pair of switches and a pair of capacitors, the pair of switches is closed to the pair of capacitors side in response to the offset cancellation signal based on the operation of the offset cancellation switch, whereby an offset component on the pair of signal lines is canceled by the pair of capacitors.

10. The modulation analyzing apparatus according to claim 1, further comprising:

an impedance changeover switch provided at the panel of a modulation analyzing apparatus main body; and an impedance switching section for switching an impedance of the pair of signal lines based on the operation of the impedance changeover switch.

11. The modulation analyzing apparatus according to claim 10, wherein, at the pair of impedance switching sections, a first resistor having a high resistance value Ru, a second resistor having a lower resistance value Rb and a serial circuit of a switch are connected to each other in parallel, one end of which is connected to the pair of signal lines, and the other end of which is grounded;

the respective switches are closed by a switching signal based on the operation of the impedance changeover switch, whereby the resistance value of the pair of impedance switching sections is obtained as Ru.Rb/(Ru+Rb); and the respective switches are opened based on the non-operation of the impedance changeover switch, whereby the resistance value of the pair of impedance switching sections are obtained as Ru.

12. The modulation analyzing apparatus according to claim 1, comprising a control section that enables switching and setting of the balance/imbalance transmission format of the modulation signal inputted to the quadrature modulating section of the sample machine on a setting screen of the display section provided at the panel of the modulation analyzing apparatus main body.

13. The modulation analyzing apparatus according to claim 1, comprising a control section that enables switching and setting of whether or not to cancel the offset component of the signal transmitted to the pair of signal lines on the setting screen of the display section provided at the panel of the modulation analyzing apparatus main body.

14. The modulation analyzing apparatus according to claim 1, comprising a control section that enables switching and setting of the impedance of the pair of signal lines on the setting screen of the display section provided at the panel of a modulation analyzing apparatus main body.

15. The modulation analyzing apparatus according to claim 1, further comprising an offset voltage cancellation section for canceling an offset voltage based on an input bias current of an amplifier included in the computer.

* * * * *